May 19, 1970 A. J. TROST 3,513,267
LOW INPUT IMPEDANCE PLAYBACK PREAMPLIFIER FOR SWAMPING OUT HEAD RESONANCE IN A VIDEO TAPE REPRODUCING SYSTEM
Original Filed May 16, 1966
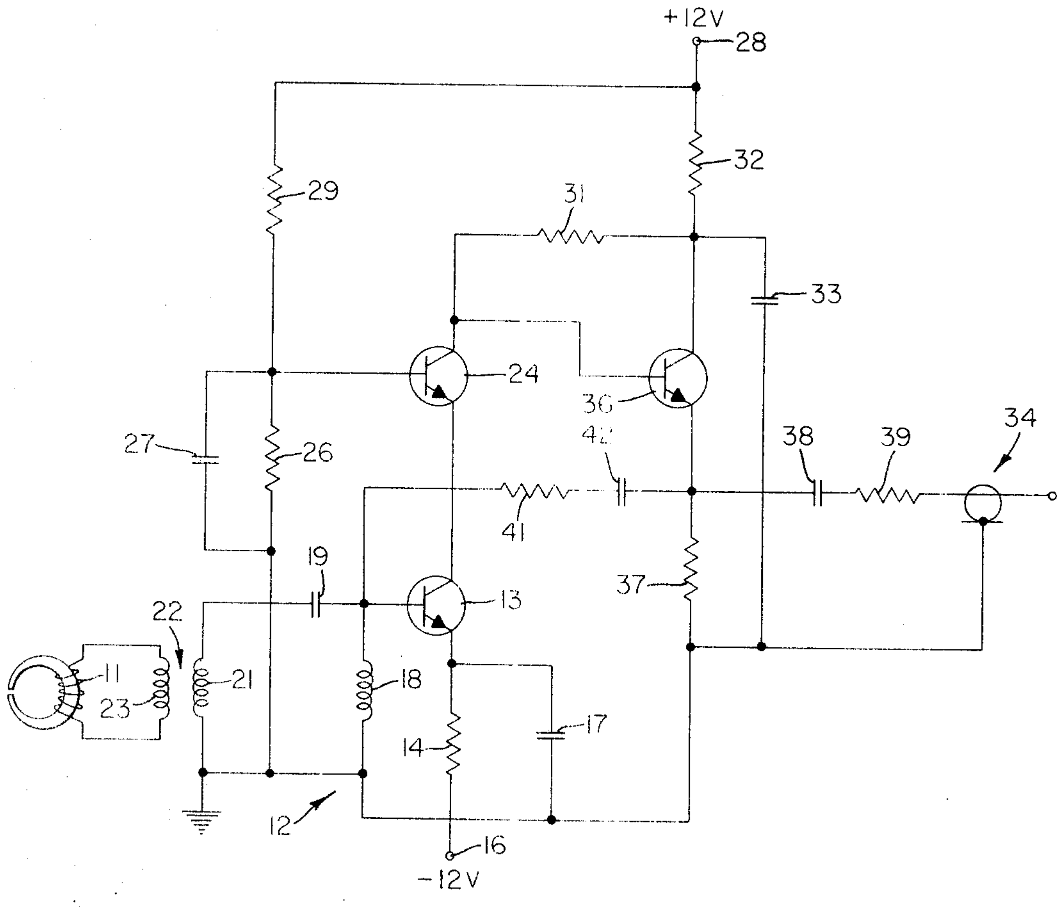
INVENTOR
ALLEN J. TROST
BY Robert G. Clay
ATTORNEY United States Patent Office 3,513,267

Patented May 19, 1970

3,513,267

LOW INPUT IMPEDANCE PLAYBACK PREAMPLIFIER FOR SWAMPING OUT HEAD RESONANCE IN A VIDEO TAPE REPRODUCING SYSTEM

Allen J. Trost, Santa Clara, Calif., assignor to Ampex Corporation, Redwood City, Calif., a corporation of California Continuation of application Ser. No. 550,305, May 16, 1966. This application Apr. 25, 1969, Ser. No. 819,225

Int. Cl. G11b *5/44;* H03f *1/42*

U.S. Cl. 179—100.2 6 Claims

ABSTRACT OF THE DISCLOSURE

A video tape reproducing system having a low input impedance playback preamplifier connected in parallel with the magnetic video head of the system to swamp out head resonance.

This application is a continuation of my prior copending application, Ser. No. 550,305, filed May 16, 1966, now abandoned.

This invention relates generally to preamplifiers for use in video tape reproducing systems, and is more particularly directed to a preamplifier which in combination with a video tape magnetic transducing system provides a relatively flat response over a wide frequency range.

Preamplifiers are typically employed in a video tape reproducing system to raise the signal from the magnetic transducer heads to a level which is suitable for driving a power amplifier. Heretofore such preamplifiers have had high input impedances compared to the impedances of the heads. The frequency response of the overall combination of the preamplifier and head circuitry has therefore been determined principally by the impedance of the head circuitry. A head exhibits resonance effects which result in a relatively peaked frequency response for the head and preamplifier combination. It has therefore been customary to incorporate a rather extensive arrangement of equalization networks in the preamplifier and following reproduce circuitry in order to provide the desired flat response.

It is an object of this invention to provide a reproduce preamplifier which when coupled to a magnetic transducer head provides an overall frequency response that is relatively flat.

Another object of the invention is the provision of a low input impedance reproduce preamplifier.

It is a further object of the invention to provide a preamplifier of the class described which materially reduces the equalization requirements of the reproduce system.

Other objects and advantages of the invention will become apparent upon consideration of the following description thereof in conjunction with the accompanying drawing wherein the sole figure is a schematic circuit diagram of a preferred embodiment of the present invention.

Referring now to the drawing, the present invention in its broad aspects will be seen to comprise a magnetic transducer head having its winding 11 coupled to the input of a low input impedance preamplifier 12. The impedance of the head circuit is in parallel with the low input impedance of the preamplifier. The preamplifier input impedance is very low compared to the head circuit impedance such that the impedance of the parallel combination is also very low and approximately equal to the preamplifier input impedance. The quality factor (Q) of the parallel circuit is thus very low since the Q is a direct function of the circuit impedance. By virtue of the low Q, the frequency response of the head circuit and preamplifier combination is essentially flat over a wide frequency range and the resonant peak of the head circuit is swamped out.

Although a variety of low input impedance preamplifier configurations may be employed in accordance with the inventive concept outlined above, a cascade arrangement with negative feedback to provide a low input impedance is preferred in order to reduce noise. More particularly, the preamplifier 12 preferably includes an input transistor 13 connected in common emitter configuration. The emitter of transistor 13 is coupled by means of a bias resistor 14 to a bias supply terminal 16, herein designated as −12 volts, transistor 13 being of type NPN. The emitter is also connected to a decoupling capacitor 17, in turn connected to ground. The base, or input electrode of transistor 13 is coupled by means of a choke 18 to ground, and by means of a coupling capacitor 19 to one end of a secondary winding 21 of a rotary transformer 22, the other end of the winding being connected to ground. The head winding 11 is connected across a primary winding 23 of the transformer 22 to thus provide the input to the preamplifier.

The transistor 13 is cascaded with a second transistor 24 connected in common base configuration. In this regard, the output or collector electrode of transistor 13 is directly connected to the control or emitter electrode of transistor 24. The base of transistor 24 is coupled to ground by means of a resistor 26 and parallel decoupling capacitor 27, and to a bias supply terminal 28 through a bias resistor 29. The bias terminal 28 is designated as being +12 volts in the present case inasmuch as transistor 24 is of type NPN. The collector, or output electrode of transistor 24 is couplied by series resistors 31 and 32 to the bias terminal 28, and a decoupling capacitor 33 is connected between the common junction between these resistors and ground.

In order to provide impedance matching between the output of transistor 24 and a low impedance coaxial cable 34 serving as the output of the preamplifier, a transistor 36 connected in common collecter (frequently termed emitter follower) configuration is coupled therebetween. More particularly, in the illustrated case transistor 36 is of type NPN and the collecter thereof is connected to the common junction between resistors 31 and 32. The collector is thus coupled to the positive bias terminal 28 through resistor 32. The base of transistor 36, serving as the control electrode, is connected directly to the collector of transistor 24, which functions as the output electrode thereof. The emitter, or output electrode of transistor 36 is connected to a load resistor 37, in turn connected to ground. The cable 34 is coupled by means of a DC blocking capacitor 38 and series resistor 39 to the emitter of transistor 36.

The desired low input impedance of the preamplifier is provided by negative feedback between the emitter of the output transistor 36 and the base of the input transistor 13. In this regard a feedback resistor 41 and series DC blocking capacitor 42 are connected between such emitter and base. As previously explained, the low input impedance thus established, in combination with the head circuit impedance provide an overall Q that is quite low. The response of the head circuit and preamplifier combination in therefore substantially flat over a wide frequency range. The negative feedback has no appreciable effect on the signal-to-noise ratio of the circuit inasmuch as the input transistor 13 is connected in common emitter configuration to provide maximum power gain. This power gain is sufficient to override noise contributed by the following stages.

Although the invention has been described hereinbefore with respect to a single preferred embodiment, it will be appreciated that numerous modifications and changes may be made therein without departing from the true spirit and scope of the invention, and thus it is not intended to limit the invention except by the terms of the following claims.

What is claimed is:

1. In a video tape magnetic reproducing system having a magnetic tape on which the video signal is recorded as a modulated signal, a playback preamplifier having a response extending over a wide frequency range and a magnetic video head circuit for reproducing the recorded modulated signal, said head circuit being connected to the input stage of said preamplifier and having its resonant peak within the bandpass of said preamplifier, the input stage of said preamplifier having an input impedance which is very low relative to the impedance of the said head circuit to thereby swamp out the resonant peak of said head circuit, said input stage of said preamplifier having sufficient power gain to override noise contributed by following stages of said preamplifier.

2. Apparatus according to claim 1 wherein the input stage of the preamplifier is a transistor connected in a grounded emitted configuration having negative feedback applied to its base.

3. Apparatus according to claim 2 wherein said preamplifier includes a second stage which is a transistor coupled in cascade with said input stage.

4. Apparatus according to claim 1 wherein the input stage of the preamplifier is a transistor connected in a grounded emitter configuration, and the preamplifier includes a second and a third stage, the second stage being a transistor connected in common base configuration and having its emitter coupled to the collector of the input stage, and the third stage being a transistor coupled in common collector configuration with its base coupled to the collector of said second stage, and a resistor coupling the emitter of said third stage to the base of the input stage.

5. A magnetic tape reproducing preamplifier arrangement comprising a magnetic transducer head, and a preamplifier having an input impedance which is low relative to the impedance of said head, said preamplifier including a first transistor stage connected in common emitter configuration, said first stage having an input coupled in parallel with said head, a second transistor stage connected in common base configuration and having an input coupled to the output of said first stage, a third transistor stage connected in common collector configuration and having an input coupled to the output of said second stage, and a feedback resistor connected between the output of said third stage and the input of said first stage to provide a low input impedance, said head coupled to the input of said preamplifier with the head impedance in parallel with the input impedance of the preamplifier to provide a combined low impedance and a corresponding low quality factor.

6. A magnetic tape reproducing preamplifier arrangement comprising a magnetic transducer head; and a preamplifier having an input impedance which is low relative to the impedance of said head, said preamplifier comprising first, second, and third transistors, each having emitter, base, and collector, bias supply means, a resistor coupling the emitter of said first transistor to said bias supply means, a capacitor coupling the emitter of said first transistor to ground, a choke coupling the base of said first transistor to ground, a rotary transformer including primary and secondary windings, said primay winding connected in parallel with a winding of said head, a second capacitor coupling the first end of said secondary winding to the base of said first transistor, the second end of said secondary winding being connected to ground, said collector of said first transistor connected to said emitter of said second transistor, a second resistor and third capacitor in parallel coupling the base of said second transistor to ground, a third resistor coupling the base of said second transistor to said bias supply means, a fourth resistor connected between the collector of said second transistor and the collector of said third transistor, said collector of said second transistor connected to said base of said third transistor, a fifth resistor coupling said collector of said third transistor to said bias supply means, a fourth capacitor coupling the collector of said third transistor to ground, a sixth resistor coupling the emitter of said third transistor to ground, and a seventh resistor connected between the emitter of said third transistor and base of said first transistor; said head coupled to the input of said preamplifier with the head impedance parallel with the input impedance of the preamplifier to provide a combined low impedance and corresponding low quality factor.

References Cited

Transistor Tape Pre-amplifier by P. F. Ridler, Wireless World, December 1958, pp. 572–73.

BERNARD KONICK, Primary Examiner

R. S. TUPPER, Assistant Examiner

U.S. Cl. X.R.

330—28